DIGITAL-TO-ANALOG CONVERTER

Filed Jan. 24, 1964 2 Sheets-Sheet 1

INVENTOR.
PHILIP D. WASSERMAN
BY
Samuel B. Stone
ATTORNEY

Sept. 13, 1966 P. D. WASSERMAN 3,273,143

DIGITAL-TO-ANALOG CONVERTER

Filed Jan. 24, 1964 2 Sheets-Sheet 2

INVENTOR.
PHILIP D. WASSERMAN
BY Samuel B. Stone
ATTORNEY

United States Patent Office 3,273,143

Patented Sept. 13, 1966

3,273,143
DIGITAL-TO-ANALOG CONVERTER

Philip D. Wasserman, San Pablo, Calif., assignor to Beckman Instruments, Inc., a corporation of California Filed Jan. 24, 1964, Ser. No. 340,065
10 Claims. (Cl. 340—347)

This invention relates to a potentiometer and more particularly to a digitally operated potentiometer which may be employed in a digital-to-analog converter.

One type of voltage divider or potentiometer employed in certain digital-to-analog converters is a Wolff-Poggendorf potentiometer. This particular potentiometer has the characteristic that while providing different output voltages, the load on the associated voltage source is maintained substantially constant. There are various other types of potentiometers and voltage dividers employed in digital-to-analog converters but most of these, including the Wolff potentiometer, employ a plurality of resistances of different ohmic values. There are certain limitations on the maximum desired resistance to be used in such a potentiometer and, of course, for simplicity and economy it is desirable that as many of the resistances in the potentiometer be of the same ohmic value.

Accordingly, it is a feature of the present invention to provide a potentiometer for use in digital-to-analog converters in which substantially all of the resistances therein are either the same ohmic value or integral multiples thereof.

An additional feature of the present invention is the provision of a potentiometer which operates as a substantially constant load on a voltage source, and which is constructed of resistances, most of which are equal in ohmic value of integral multiples thereof.

According to an illustrative preferred embodiment of the present invention, a digitally operated potentiometer for providing digitally weighted output voltages is constructed with a plurality of resistances of equal ohmic value. The potentiometer is connected with a voltage source and digitally operated switches are provided for selectively shunting each of said resistances. Shunt resistances are also included in the potentiometer circuitry for selecting the incremental voltage weights provided by the potentiometer. A plurality of potentiometers may be connected together to provide plural decades for a digital-to-analog converter.

Other features and objects of the invention will be better understood from a consideration of the following detailed description when read in conjunction with the attached drawings in which.

Figure 1:
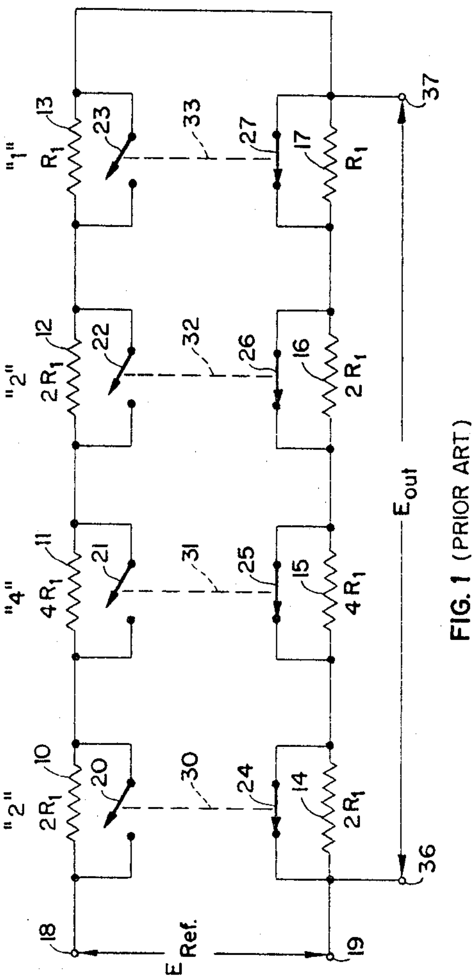
FIG. 1 (PRIOR ART)
FIG. 1 illustrates a prior art Wolff-Poggendorf voltage divider.

Referring now to FIG. 1, a Wolff-Poggendorf voltage divider or potentiometer is shown. This potentiometer includes a plurality of bit resistances 10 through 17 connected in series between terminals 18 and 19. The terminals 18 and 19 are adapted to be connected to a reference voltage source (not shown), which may be designated $E_{ref}$. Switches 20 through 27 are connected in shunt with the respective resistances 10 through 17. The switches 20 and 24, 21 and 25, 22 and 26 and 23 and 27 are interconnected as designated by respective dashed lines 30 through 33 to indicate that these switches operate together and in a complementary fashion. That is, when the switch 20 is open, the switch 24 is closed, and vice versa. The same operation holds true for the remaining sets of switches. The switches 20 through 27 may take the form of either mechanical switches or electronic switches, such as transistor switches. Typical digital-to-analog converters which employ the Wolff-Poggendorf potentiometer, and similar potentiometers, utilize reed relays. These relays generally include a pair of reeds encased in a glass capsule and are operated by applying a magnetic field thereto. Output terminals 36 and 37 are connected across the resistances 14 through 17 to enable an output voltage, $E_{out}$, to be derived from the potentiometer.

As shown in FIG. 1, the resistances are weighted according to a 2–4–2–1 coding system whereby 0 through 9 increments of output voltage, $E_{out}$, may be provided. For example, with the switches 24 through 27 closed as shown, $E_{out}$ is zero. By opening a single one or a desired combination of the switches 24 through 27, the various increments of output voltage are provided. When used in a digital-to-analog converter, the potentiometer shown in FIG. 1 may constitute a single decade providing voltages between zero and nine volts in one volt steps. Two identical sections will produce from 0 through 9.9 volts in .1 volt steps, and additional decades may be added to produce smaller and smaller steps.

There are certain limitations on the use of the Wolff potentiometer in high accuracy digital-to-analog converters. Typically, digital-to-analog converters are employed in analog-to-digital converters and in digital voltmeters to provide accurate measurement of analog quantities. Since the instrument is no more accurate than its digital-to-analog converter, it is, of course, desirable to provide a highly accurate digital-to-analog converter. Practical considerations limit the value of resistances which may be used in the Wolff potentiometer. In a five-decade unit, if the smallest bit (corresponding to a weight of "1") in the lowest decade (I) is $R_1$, then the highest bit (corresponding to a weight of "4") in the highest decade (V) must be $40\times10^3R_1$. Since the stability of the potentiometer depends primarily on the stability of the high value resistors, it is important that these be optimized. Resistor manufacturers find their most stable resistors are generally in the region of 10,000 ohms. Also, economic factors enter into the choice of resistances. High value resistors cost more than lower value resistors because of the additional wire and winding time involved.

In low level circuits it is desirable to minimize the potentiometer resistance in order to reduce voltage "pick-up" problems. Additional limitations are encountered when reed relays are employed for shunting the resistances in the potentiometer. When the reed relay opens, the reeds continue to vibrate for a short period of time thereby modulating the capacitance between the contacts thereof and producing an A.C. current flow in the potentiometer which upsets the comparison circuit which may be associated with the potentiometer in a digital voltmeter. Since this disturbance is in the form of a current, the magnitude of the voltage produced depends directly upon the potentiometer resistance.

Figure 2:
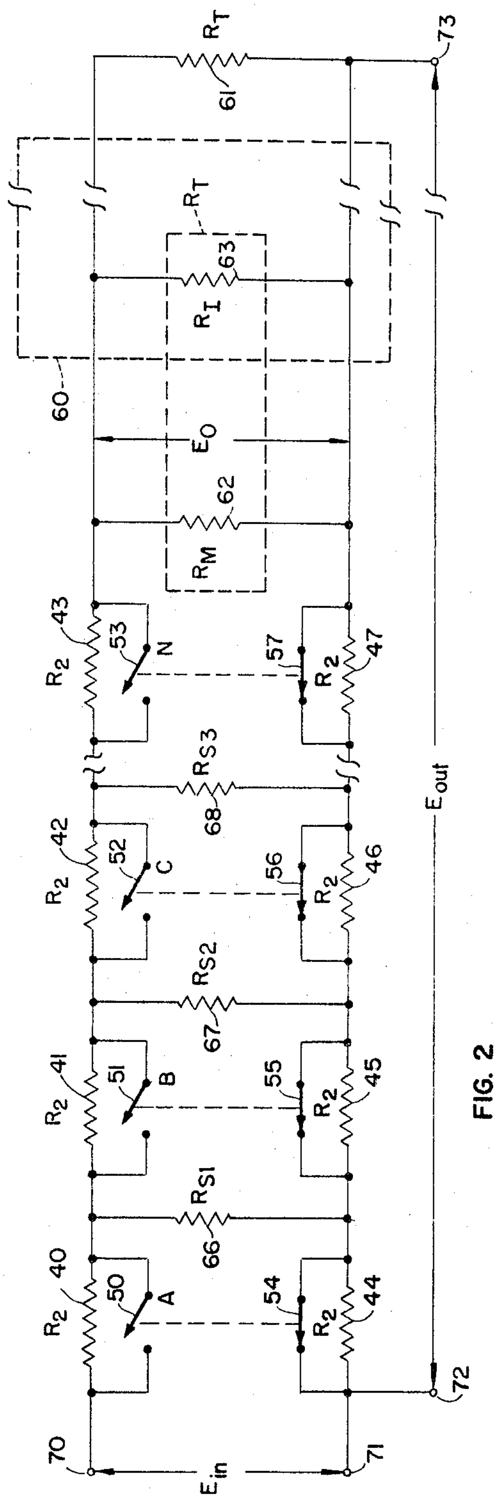
FIG. 2 is a circuit diagram illustrative of the concepts of the present invention.

Referring now to FIG. 2, an improved digitally controlled potentiometer is shown which incorporates the concepts of the present invention. The superiority of this circuitry over the Wolff-Poggendorf potentiometer will be explained in detail subsequently. The potentiometer shown in FIG. 2 is shown and discussed in general terms to facilitate the derivation of potentiometers for any desired coding, such as 8–4–2–1, 4–2–2–1, 2–2–2–2–1, etc. The potentiometer shown in FIG. 2 includes a plurality of series connected bit resistances R numbered 40 through 47 and arranged to be selectively shunted by respective switches 50 through 57 in a manner similar to the Wolff potentiometer shown in FIG. 1. A single decade of these resistances is shown, and additional decades of similar resistances may be employed as illustrated by the dashed line box 60. A terminating resistance $R_t$ which is denoted by a reference numeral 61 is included in the circuitry after the last decade. Actually, each decade effectively includes a terminating resistance $R_t$, but this resistance for intermediate decades is composed of the parallel combination of a matching resistance $R_m$, denoted by a reference numeral 62, which is the matching resistance at the end of each decade to permit proper loading, and an input resistance $R_i$, denoted by a reference numeral 63, which is the input resistance looking into a decade.

Shunt resistances are provided in each decade to provide the various coding (such as, 4–2–2–1). A first shunt resistance $R_{s1}$ denoted by the reference numeral 66 is connected between the junction of the resistances 40 and 41 and the junction of the resistances 44 and 45. A second shunt resistance $R_{s2}$ denoted by the reference numeral 67 is connected between the junction of the resistances 41 and 42 and the junction of the resistances 45 and 46. In a similar manner, a third shunt resistance $R_{s3}$ denoted by the reference numeral 68 is connected between the junction of the resistances 42 and 43 and the junction of the resistances 46 and 47. As will be explained subsequently, the ohmic value of certain of the shunt resistances $R_s$ may be infinity depending upon the desired coding of the decade. Input voltage terminals 70 and 71 are connected to respective resistances 40 and 44, and output voltage terminals 72 and 73 are respectively connected to the resistances 44 and 61 as shown. As with the Wolff potentiometer, the switches 50 through 53 and 54 through 57, respectively, are operated together in a complementary fashion as indicated by the dashed lines interconnecting the switches.

Figure 3:
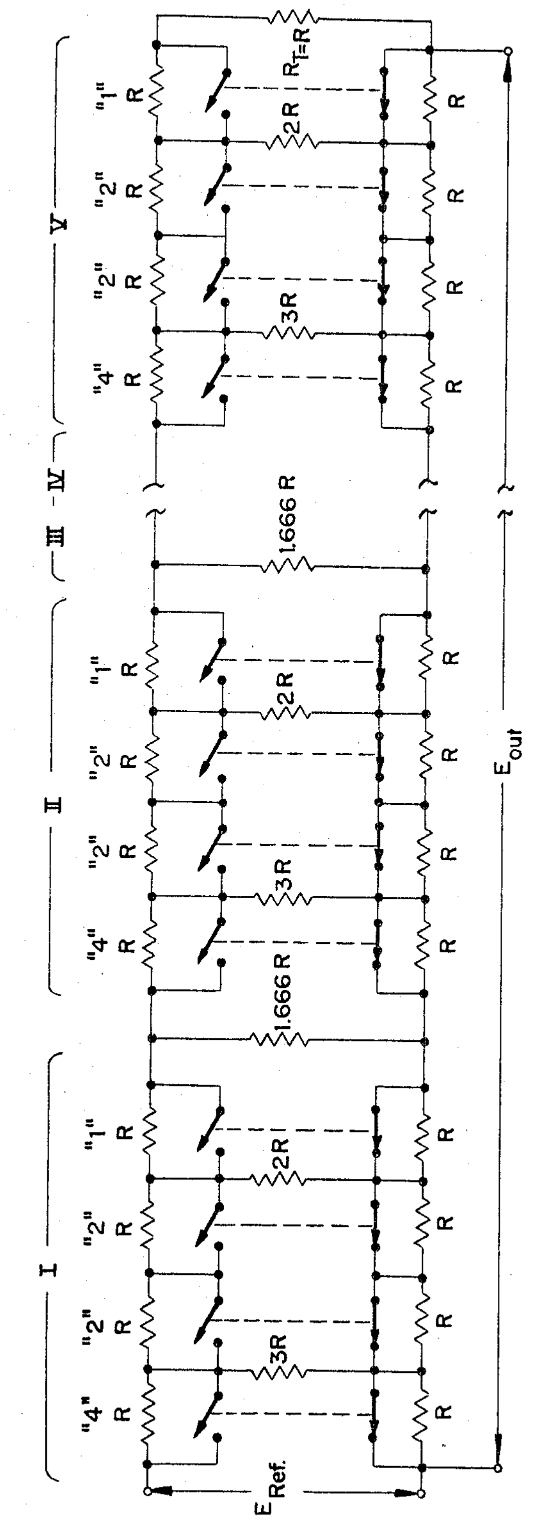
FIG. 3 is a circuit diagram of one preferred form of the present invention.

For a better understanding of the novel features and simplicity of the present invention, reference should be made to FIG. 3 before proceeding with a mathematical explanation of the manner in which this latter circuit is derived and its advantages over the Wolff-Poggendorf potentiometer. FIG. 3 illustrates a five-decade potentiometer as it may be employed in a digital-to-analog converter. Each of the decades is coded 4–2–2–1. All of the bit resistances R are of equal value, and all shunt resistances except the matching resistance ($R_m$) is an integral multiple of the bit weight resistances. Thus, it should be appreciated that with substantially all of the resistances being of equal ohmic values, or integral multiples thereof, great economies in manufacture as well as greater precision in matching resistances can be achieved. Typically, the value of R as shown in FIG. 3 may be 10,000 ohms and $E_{ref}$ may be 10 volts. With such an arrangement, the first decade provides increments of 0 to 9 volts, the second decade provides increments of 0 to .9 volt, the third decade provides increments of 0 to .09 volt, the fourth decade provides increments of 0 to .009 volt, and the fifth decade provides increments of 0 to .0009 volt. Thus, the smallest increment available is .0001 volt, or 100 microvolts. As with the Wolff potentiometer, the complementary switching operation maintains a substantially constant load on the reference voltage source.

In addition to the greater economies in manufacture and the greater precision of the over-all circuitry, the undesired offset voltage generated by a potentiometer constructed in accordance with the teachings of the present invention is much less than with the Wolff-Poggendorf potentiometer. As is well known in the art, switches have some contact resistance, and when current passes therethrough an undesired offset voltage is produced. In the Wolff potentiometer shown in FIG. 1, the current through the resistances 10 through 17 is constant because each switch and resistor has associated therewith a complementary switch and resistor in the same current loop. Thus, when the switch 20 is open, the switch 24 is closed. Taking $R_1$ as the resistance corresponding to the "1" bit (resistance 13), the total loop resistance is $2R_1+4R_1+2R_1+R_1$ which is equal to $9R_1$. Thus, the sum of all bit weights is nine, and this sum may be termed W. Hence the total loop resistance is $WR_1$. In a two-decade system, W is 99 and the loop resistance is $99R_1$. Similarly, a three-decade system has a loop resistance of $999R_1$, a four-decade system $9999R_1$ and so on.

The current I existing in the loop is equal to $E_{ref}/WR_1$. When this current I flows through the closed switches 24 through 27 a voltage drop exists resulting in an output voltage, $E_{out}$, even when the potentiometer is set at zero (switches 24 through 27 closed) because of the contact resistance of these switches. If N is the number of bits in the potentiometer and $R_c$ is the contact resistance of a single switch, then the total contact resistance seen at the output terminals 36 and 37 is $NR_c$. For example, in FIG. 1 there are four bits shown (2, 4, 2, and 1) and the contact resistance is $4R_c$. A two-decade system would have eight bits, a three-decade system twelve bits, etc. With a total contact resistance of $NR_c$ and a current I through this contact resistance, the offset voltage, $E_{offset}$, across terminals 36 and 37 is equal to $INR_c$. Since $$I=\frac{E_{ref}}{WR_1},\text{ therefore }E_{offset}=\frac{E_{ref}NR_c}{WR_1} \tag{1}$$

Hence, assuming a five-decade 2–4–2–1 binary coded decimal potentiometer with .5 ohm being the lowest resistance and having a 10 volt reference supply, the offset voltage is, $$E_{offset}=\frac{10\times(5\times4)R_c}{99999\times.5}\approx4\times10^{-3}R_c \tag{2}$$

In a five-decade system the highest bit weight is $40\times10^3$ and, in this case, is a resistance of 20,000 ohms.

For a comparison with the Wolff potentiometer, consider a single decade of the potentiometer shown in FIG. 2. The current through a given switch or its associated resistance is constant independent of the state of the other bits. This is a result of the complementary arrangement of the switches and resistors. This current I flows either through the resistor if the switch is open or through the switch if the switch is closed. Assuming that one of the switches 54 through 57 is open, then a voltage is produced according to the weight of that particular bit relative to the total bit weight and the value of the reference voltage. For example, a five-decade system has a total bit weight W of 99999 and the highest "4" bit produces 40,000/99999 of the reference voltage when its switch is open (approximately 4 volts with a reference voltage of 10 volts). Generally, the voltage produced by a given bit is $$\frac{B_nE_{ref}}{W}$$

where, $B_n$ is the weight of the bit in question (40,000 in the present case). The current I which flows through the resistor $R_2$ to produce this voltage may be expressed as:

$$I=\frac{B_nE_{ref}}{WR_2} \tag{3}$$

Since this same current flows through the associated switch when it is closed, the contribution to offset voltage by each switch is, $$\frac{B_nE_{ref}R_c}{WR_2} \tag{4}$$

and the total offset voltage is the sum of all the individual contributions and may be expressed as:

$$E_{offset}=\frac{B_1E_{ref}R_c}{WR_2}+\frac{B_2E_{ref}R_c}{WR_2}+\ldots\frac{B_nE_{ref}R_c}{WR_2} \tag{5}$$

Factoring yields $$\frac{E_{ref}R_c}{WR_2}(B_1+B_2+\ldots B_n) \quad (6)$$

However, $B_1+B_2+\ldots B_n=W$, and the equation reduces to the form:

$$E_{offset}=\frac{E_{re/}R_c}{R_2} \quad (7)$$

Therefore, assuming a five-decade 2–4–2–1 binary coded decimal potentiometer with $R_2$ equal to 10,000 ohms and having a 10 volt reference supply, the offset voltage is $$E_{offst}=\frac{10R_c}{10,000}=10^{-3}R_c \quad (8)$$

With $R_2$ equal to 25,000 ohms, the offset voltage is equal to $.4R_c\times10^{-3}$. Hence, it should be apparent that there is a considerable reduction in the offset voltage produced by a potentiometer constructed in accordance with the teachings of the present invention.

Although a five-decade potentiometer having a 4–2–2–1 coding is disclosed in FIG. 3, the concepts of the invention may be utilized to provide potentiometers having other codings. Reference will now be made to FIG. 2 and a mathematical analysis will be provided for deriving potentiometers of other desired codings. Although a four bit potentiometer is shown in FIG. 2, it is to be understood that greater or fewer bits may be utilized depending upon the coding desired.

Consider the bit weights of the potentiometer in FIG. 2 as being arranged in descending order, such as the A, B, C, and N portions of the potentiometer in FIG. 2 respectively corresponding to bit weights 4–2–2–1. Thus, the resistances 40, 44 and 66 are associated with the first bit, the resistances 41, 45 and 67 are associated with the second bit, etc. Next, the reference voltage $E_{in}$, or $E_{ref}$, should be chosen. Since the binary coded decimal nature of a typical digital-to-analog converter dictates that successive decades (which are identical as far as resistance values and configuration are concerned) produce 1/10 the voltage for a given bit insertion that the preceding decade does, the output voltage of a given decade is 1/10 of its input voltage, and this output voltage is the input voltage to the next following decade. Therefore, $$E_0=.1E_{in} \quad (9)$$

Since the sum of the drops around the loop must be zero, $E_{in}$ must equal the sum of the bit weights, $B_{wt}$, in a decade times the voltage ($E_1$) corresponding to a "1" bit plus $E_0$. Therefore, $$E_{in}=B_{wt}E_1+E_0 \quad (10)$$

By substituting for $E_0$ from Equation 9.

$$E_{in}=B_{wt}E_1+.1E_{in} \quad (11)$$

or $$E_{in}=\frac{B_{wt}E_1}{.9} \quad (12)$$

Thus, for a 4–2–2–1 code $B_{wt}$ is 4+2+2+1=9 and if $E_1$ is 1 volt, $E_{in}$ is 9/.9=10.0 volts. In the first decade $E_{in}$ is $E_{ref}$ and presents $.1E_{ref}$ to the next decade.

Next, determine the terminating resistance $R_t$. In practice this resistor is composed of the input resistance of the remainder of the properly terminated sections connected to the right, and a matching resistor $R_m$. Only on the last section where there are no more sections to the right will $R_t$ be used alone. The current $I_t$ through the terminating resistance is equal to the current through the "1" bit resistance and is $E_1/R_2$. Since $E_0$ has been found to be $.1E_{in}$ in Equation 9, and by substituting from Equation 12

$$Rt=\frac{E_0}{I_t}=\frac{E_0R_2}{E_1}=\frac{.1E_{in}R_2}{E_1}=\frac{B_{wt}R_2}{9} \quad (13)$$

The values of the shunt resistors $R_{s1}$, $R_{s2}$, $R_{s3}$, etc. should then be determined. First, determine the desired voltage drops across the resistors $R_2$. For a given bit *n*, with a weight value of $B_{wn}$, this voltage is $B_{wn}E_1$. A voltage $E_s$ across a given shunt resistor $R_s$ connected to the right of a resistor of bit voltage $B_{wn}E_1$ is the sum of all voltage drops to the right and may be written as $$E_s=B_{wn}E_1+B_{w(n-1)}E_1\ \ldots\ B_{w1}E_1+E_0 \quad (14)$$

$$=E_1(B_{wn}+B_{w(n-1)}\ \ldots\ B_{w1})+E_0 \quad (15)$$

The current $I_s$ through a given shunt resistor is the difference between the input current to the node to which it is connected and the output current. Since the current coming from the left is $$E_1\frac{B_{w(n+1)}}{R_2}$$

and the current leaving to the right is $$\frac{E_1B_{wn}}{R_2}$$

then $$I_s=\frac{E_1}{R_2}B_{w(n+1)}-\frac{E_1}{R_2}B_{wn} \quad (16)$$

but, $$R_s=\frac{E_s}{I_s} \quad (17)$$

and by substituting from Equations 15 and 16 into Equation 17 and simplifying, then $$R_s=R_2\left(\frac{E_1(B_{wn}+B_{w(n-1)}\ \ldots\ B_{w1})+E_0}{E_1(B_{w(n+1)}-B_{wn})}\right) \quad (18)$$

If $B_{wr}$ is defined as all bit weights existing to the right of a given shunt resistor, $B_{wr}=(B_{wn}+B_{wn-1}\ \ldots\ B_{w1})$, then any particular shunt resistance $R_s$ can be expressed:

$$R_s=\frac{E_1(B_{wr})+E_0}{E_1(B_{w(n+1)}-B_{wn})} \quad (19)$$

$$=R_2\frac{B_{wr}}{B_{w(n+1)}-B_{wn}}+\frac{E_0}{E_1}\times\frac{1}{B_{w(n+1)}-B_{wn}} \quad (20)$$

Thus, the first term in the above equation is $R_2$ times the ratio of all bit weights to the right to the difference between the bit weight immediately to the left and the one immediately to the right of the particular shunt resistance $R_5$ being computed. The second term is the ratio of the output voltage $E_0$ to the unit bit voltage $E_1$, multiplied by the reciprocal of the difference between the bit weight immediately to the left and the bit weight immediately to the right of the particular shunt resistance $R_s$ being computed.

In the 4–2–2–1 coded potentiometer shown in FIG. 3 there is no shunt resistor (or infinite resistance) at the junction between the two "2" bits. This may be easily seen from the above equation since the bit weight to the left equals the bit weight to the right and, hence, $$B_{w(n+1)}-B_{wn}$$

equals zero.

It is now necessary to determine the matching resistor $R_m$ which in parallel with the input resistance $R_i$ of all following sections determines $R_t$. The matching resistance $R_m$ may be expressed as $$R_m=\frac{R_tR_i}{R_i-R_t} \quad (21)$$

Since $$R_i=\frac{E_{in}}{I_{in}} \quad (22)$$

and, $$I_{in}=\frac{E_1B_{wh}}{R_2} \quad (23)$$

where $B_{wh}$ is the highest bit weight, then substituting from Equations 23 and 12 into Equation 22

$$R_1=\frac{E_{in}R_2}{E_1B_{wh}}=\frac{B_{wt}R_2}{.9B_{wh}} \quad (24)$$

Therefore, substituting from Equation 13 and simplifying gives, $$R_m=\frac{\frac{B_{wt}R_2}{9}\times\frac{B_{wt}R_2}{.9B_{wt}}}{\frac{B_{wt}R_2}{.9B_{wh}}-\frac{B_{wt}R_2}{9}}=\frac{B_{wh}R_2}{9(1-.1B_{wh})} \quad (25)$$

In order to ensure complete understanding of all the terms used in the above equations, the following explanation of these terms is set forth below:

$R_2$—the bit resistance in parallel with each switch.

$R_s$—a shunt resistor associated with a bit resistance, further identified by a numeral subscript such as $R_{s1}$, $R_{s2}$, etc.

$R_m$—a shunt matching resistance at the end of a decade to permit proper loading.

$R_1$—the input resistance looking into a decade.

$R_t$—the terminating resistance of each decade which, except for the last decade, is formed by the parallel combination of $R_1$ and $R_m$.

$E_{in}$—the input voltage to any decade.

$E_{ref}$—the input voltage to the first decade.

$E_1$—the voltage across a resistance $R_2$ corresponding to a "1" bit in a decade when its corresponding switch is open.

$E_o$—the output voltage of any decade (also the input voltage presented to the next succeeding decade).

$I_s$—the current in a shunt resistor $R_s$.

$I_{in}$—the input current to a decade.

$B_{wr}$—the sum of all bit weights to the right of a given shut resistor $R_s$ in a decade.

$B_{wn}$—the weight of the bit to the right of a particular shunt resistance $R_s$ being computed.

$B_{wt}$—the sum of all bit weights in a decade.

$B_{wh}$—the highest bit weight in a decade.

$E_{out}$—the output voltage of all decades (is dependent upon the state of the switches).

It will be understood that although an exemplary embodiment of the present invention has been disclosed and discussed, other applications and arrangements are possible and that the embodiment disclosed may be subjected to various changes, modifications, and substitutions without necessarily departing from the spirit of the invention.

What is claimed is:

1. A digitally operated potentiometer for providing digitally weighted output voltages, said potentiometer including a plurality of decades each of which has a pair of input terminals and a pair of output terminals, the input terminals of the first of said decades being adapted to receive a source of reference voltage, one of said input terminals of the first of said decades and one of the output terminals of the last of said decades serving as the output terminals of the potentiometer for providing the digitally weighted output voltages, the improvement comprising each of said decades including a first plurality of resistances of equal ohmic value connected between the first input and output terminals thereof, each of said decades including a second plurality of resistances of equal ohmic value connected between the second input and output terminals thereof, the resistances connected between the first input and output terminals respectively being equal to the resistances connected between the second input and output terminals of each decade, shunting switches connected across each of said retances in each decade, with the shunting switches connected across each of the resistances between the first input and output terminals of each decade respectively operating in a complementary fashion with respect to the shunting switches connected across each of the resistances between the second input and output terminals of each decade, a terminating resistance connected across the first and second output terminals of each of said decades, and shunt resistances respectively connected from the junctions of certain, but not all, of the resistances of the first plurality of resistances of each decade to respective corresponding junctions between the resistances of the second plurality of resistances of each decade, said shunt resistances functioning to select the incremental output voltage weights provided by the potentiometer.

2. A digitally operated potentiometer as in claim 1 wherein each of said decades is binary coded to produce weighted output voltages of 4, 2, 2 and 1 or combinations thereof, each of said first and second plurality of resistances in each decade including four resistances, with each of these resistances having the value R, the terminating resistance for each decade, except the last, has a value of approximately 1.666R and said last terminating resistance has a value of approximately R, a first of said shunt resistances has a value of approximately 3R and is connected between the junction of the first and second resistances of said first plurality of resistances of each decade, and the junction of the first and second resistances of said second plurality of resistances of each decade, and a second of said shunt resistances has a value of approximately 2R and is connected between the junction of the third and fourth resistances of said first plurality of resistances of each decade, and the junction of the third and fourth resistances of said second plurality of ressitance of each decade.

3. A digitally operated voltage divider for providing digitally weighted output voltages comprising first and second terminals for receiving a source of reference voltage, third and fourth terminals for connection to a terminating impedance, said second and fourth terminals serving as the output terminals of the voltage divider, a first plurality of resistances connected between said first and third terminals, a second plurality of resistances connected between said second and fourth terminals, shunting switches connected across each of said resistances with the shunting switches connected across the resistances of the first plurality of resistances operating in a complementary fashion with respect to the switches connected across each of the resistances of the second plurality of resistances, the improvement comprising the first plurality of resistances being equal in number to the second plurality of resistances, with each of said resistances being of equal ohmic value, and shunt resistances respectively connected between certain, but not all, of the respective corresponding junctions of the resistances of the first and second plurality of resistances for determining the digitally weighted output voltages.

4. A voltage divider as in claim 3 wherein each of said first and second plurality of resistances includes four resistances of equal ohmic value R, a first of said shunt resistances has an ohmic value 3R and is connected between the respective junctions of first and second of the resistances of the first plurality of resistances and the first and second of the resistances of the second plurality of resistances, and a second of said shunt resistances has an ohmic value 2R and is connected between the respective junctions of the third and fourth of the resistances of said first plurality of resistances and third and fourth of the resistances of said second plurality of resistances, whereby said voltage divider provides digitally weighted output voltage increments of 4, 2, 2 and 1 or combinations thereof.

5. A voltage divider as in claim 3 wherein each of said first and said second plurality of resistances includes an equal number of resistances, each of equal ohmic value R, and the value of any given shunt resistance is equal to $$R\frac{E_1(B_{wr})+E_0}{E_1(B_{w(n+1)}-B_{wn})}$$

where $E_1$ is the voltage across a resistance R corresponding to a digitally weighted "one" bit when its shunting switch is open, $E_0$ is the output voltage across said second and fourth terminals, $B_{wn}$ is the bit weight of the resistance next to and on the side closest to said third and fourth terminals of a particular shunt resistance being computed, and $B_{wr}$ is the sum of bit weights of the resistances located between the given shunt resistance being computed and said third and fourth terminals.

6. A voltage divider as in claim 3 wherein said number of resistances in each of said first and said second plurality of resistances is between three and eight, inclusive.

7. A digitally operated voltage divider for providing digitally weighted output voltages comprising first and second terminals for receiving a source of reference voltage, third and fourth terminals for connection to a terminating impedance, said second and fourth terminals serving as the output terminals of the voltage divider, a first plurality of resistances connected between said first and third terminals, a second plurality of resistances connected between the second and fourth terminals, shunting switches connected across each of said resistances with each of the shunting switches connected across each of the resistances of the first plurality of resistances operating in a complementary fashion with respect to each of the corresponding switches connected across each of the resistances of the second plurality of resistances, the improvement comprising said first and second plurality of resistances each including at least four resistances, with each of said resistances being of equal ohmic value, shunt resistances for determining the digitally weighted output voltages, a first of said shunt resistances being connected from the junction of a first pair of resistances in said first plurality of resistances to the junction of the corresponding first pair of resistances in the second plurality of resistances, and a second of said shunt resistances being connected from the junction of a second pair of resistances in said first plurality of resistances to the junction between the corresponding second pair of resistances in said second plurality of resistances.

8. A voltage divider as in claim 7 wherein each of the resistances in said first and second plurality of resistances has an ohmic value R, said first of said shunt resistances has an ohmic value 3R, and said second of said shunt resistances has an ohmic value 2R.

9. A voltage divider as in claim 7 wherein each of the resistances in said first and second plurality of resistances has an ohmic value R, a third of said shunt resistances being connected from the junction of a third pair of resistances in said second plurality of resistances to the junction between the corresponding second pair of resistances in said second plurality of resistances, and said first, second and third of said shunt resistances respectively having ohmic values of approximately $$\frac{13}{6}R, \frac{7}{3}R \text{ and } \frac{8}{3}R$$

10. A voltage divider as in claim 7 wherein the number of said shunt resistances is at least one less than the number of resistances in each of said first and second plurality of resistances.

No references cited.

MAYNARD R. WILBUR, *Primary Examiner.*

W. J. KOPACZ, *Assistant Examiner.*